United States Patent [19]

Okada et al.

[11] 3,925,357
[45] Dec. 9, 1975

[54] α-SULFOBENZYLPENICILLIN SALT

[75] Inventors: Hiroaki Okada, Osaka; Hiroshi Fujisawa, Uenohiga; Masahiko Fujita, Osaka; Tsugio Shimamoto, Hyogo; Hiroaki Nomura, Osaka, all of Japan

[73] Assignee: Takeda Chemical Industries, Ltd., Osaka, Japan

[22] Filed: June 19, 1973

[21] Appl. No.: 371,528

[30] Foreign Application Priority Data
July 1, 1972   Japan.............................. 47-66301

[52] U.S. Cl............................. 260/239.1; 424/271
[51] Int. Cl.$^2$................................ C07D 499/22
[58] Field of Search............................... 260/239.1

[56] References Cited
UNITED STATES PATENTS

| | | | |
|---|---|---|---|
| 3,557,094 | 1/1971 | Butler | 260/239.1 |
| 3,660,379 | 5/1972 | Morimoto et al. | 260/239.1 |

*Primary Examiner*—Nicholas S. Rizzo
*Attorney, Agent, or Firm*—Wenderoth, Lind & Ponack

[57] ABSTRACT

Novel α-sulfobenzylpenicillin di-amine salts wherein the amine is arginine, lysine or N-methylglucamine retain the excellent antimicrobial activity of α-sulfobenzylpenicillin and, when administered through injection, give no local reactions (e.g. severe pain, reddening, induration or swelling).

4 Claims, No Drawings

α-SULFOBENZYLPENICILLIN SALT

The present invention relates to novel α-sulfobenzylpenicillin salts. More concretely, the present invention relates to novel α-sulfobenzylpenicillin di-amine salts wherein the amine is lysine, arginine or N-methylglucamine.

It is generally known that when administered intramuscularly or subcutaneously, many penicillins induce local reactions at the time of injection and thereafter (such as severe pain, reddening, induration, swelling, etc. at the site of injection).

Though it is true that α-sulfobenzylpenicillin is an excellent broad-spectrum semi-synthetic penicillin which is not only inhibitory to gram-positive bacteria but also effective against gram-negative bacteria, particularly against *Pseudomonas aeruginosa*, it is not free from the local reactions during and after injections, as is the case with many other penicillins.

It has heretofore been a prevalent practice to use a local anaesthetic in conjunction with the injection of an antibiotic in order to mitigate the pain of injection, but such a practice does not offer a radical solution, for it does not inhibit the reaction of the drug with the living body which would lead to local reactions after an injection such as reddening, induration and swelling which persist even after the action of the local anaesthetic has consumed itself.

It is against this background that it has been desired to ameliorate the properties of drugs themselves and provide compounds which would be free from the local reactions during and after injections.

The present inventors have conducted extensive researches to solve said problems. Firstly, they prepared, among others, α-sulfobenzylpenicillin di-metal salts, α-sulfobenzylpenicillin mono-metal mono-amine salts wherein the amine is one of various amines including lysine, arginine and N-methylglucamine, but have found that those salts have the serious drawbacks just mentioned above. Then, they have succeeded in synthesizing the α-sulfobenzylpenicillin di-amine salts wherein the amine is arginine, lysine or N-methylglucamine and have surprisingly found that, when those salts are administered, substantially no pain was felt immediately following the injection; almost no lasting pain was felt; no other local reactions (e.g. reddening, induration, swelling, etc.) are observed; and further no hindrance against the specific antimicrobial activity of α-sulfobenzylpenicillin itself is observed.

The present inventors have also found that those specific salts are more stable against heat and less hygroscopic than α-sulfobenzylpenicillin itself or α-sulfobenzylpenicillin di-metal salt (e.g. α-sulfobenzylpenicillin disodium salt).

Therefore, it is the main object of the present invention to provide novel α-sulfobenzylpenicillin salts which give no local reactions (e.g. severe pain, reddening, induration, swelling, etc.), when administered through injection.

Another object of the present invention is to provide novel α-sulfobenzylpenicillin salts which have excellent antimicrobial properties and are more stable and less hygroscopic than α-sulfobenzylpenicillin or its di-metal salts.

A further object of the present invention is to provide an industrially feasible method for the production of the thus useful α-sulfobenzylpenicillin diamine salts.

Still further objects of the invention as well as advantages and features thereof will be apparent from the following description of the invention.

Arginine and lysine have an asymmetric carbon atom in their molecule, and these amino acids may be in the form of L-isomer, D-isomer or a mixture of L-isomer and D-isomer. But preferably these amino acids are in the form of L-isomer.

The α-sulfobenzylpenicillin di-amine salt of the present invention is produced by a method which is characterized in that α-sulfobenzylpenicillin or its salt is reacted with arginine, lysine or N-methylglucamine or a salt or arginine, lysine or N-methylglucamine.

The arginine and lysine may be in the form of L-isomer, D-isomer or a mixture of L-isomer and D-isomer. In the method of the present invention, the salt of α-sulfobenzylpenicillin is a salt of α-sulfobenzylpenicillin with any one of the bases other than arginine, lysine and N-methylglucamine, and the preferable examples of such bases include an alkaline earth metal (e.g. barium, calcium, magnesium, etc.). The salt of arginine, lysine or N-methylglucamine is also a salt of arginine or lysine or N-methylglucamine with any acid other than α-sulfobenzylpenicillin, and the preferable examples of such acids include inorganic acids (e.g. sulfuric acid, carbonic acid, etc.). However, the reaction between free α-sulfobenzylpenicillin and free amine (i.e. free arginine, lysine or N-methylglucamine) is preferred from the view point of simplicity of the procedure.

The above-mentioned free acid of α-sulfobenzylpenicillin may be the free compound which has been synthesized as such, or may be prepared by passing a salt of α-sulfobenzylpenicillin, such as the corresponding di-sodium or di-triethylamine salt, over a strongly acid ion exchange resin. It is also possible to produce the same by adjusting the material salt to pH about 1–1.5 with, for example, 1N-HCl and extracting the free compound with n-butanol. The salt of arginine, lysine or N-methylglucamine, e.g. the corresponding hydrochloride, may be converted to the free compound by treatment with, for example, a strongly basic ion exchange resin.

The reaction is usually carried out at a temperature in a range from about −10°C to about 50°C. The reaction may satisfactorily be carried out at room temperature (10°C to 35°C), but it is most preferable that the reaction is effected at a temperature below the room temperature, for example at a temperature in a range from about 0° to about 3°C.

The amount of lysine, arginine or N-methylglucamine or its salt relative to α-sulfobenzylpenicillin or its salt is usually 2 moles or slightly less or more per mole of α-sulfobenzylpenicillin or its salt. An amount more than about two moles is unnecessary for the formation of the di-amine salt, and an amount less than about 2 moles is not enough for the di-amine salt formation.

The reaction is usually carried out in a solvent, preferably in, for example, water or a mixture of water and a water-miscible solvent (e.g. methanol, ethanol, acetone, dimethylformamide, dimethylacetamide or the like).

The reaction of the present invention can be carried out in accordance with per se known means, and therefore the reaction may be effected by for example incorporating α-sulfobenzylpenicillin with lysine, arginine or N-methylglucamine in equivalent portions by one-shot addition or, alternatively reacting through a titration means while the pH of the reaction mixture is monitored and terminating the reaction when the pH value has reached the level corresponding to the equivalence point. In another reaction scheme, lysine, arginine or N-methylglucamine, or a salt of one of them, is adsorbed on a strongly acid ion exchange resin and, then, the free α-sulfobenzylpenicillin or a salt thereof is passed over the resin.

The desired penicillin salt is recovered by per se known means from the reaction mixture, for example by concentrating the reaction mixture, by lyophilizing the reaction mixture or adding a water-miscible organic solvent in which the desired di-amine salt is insoluble or only sparingly soluble. Such a solvent is exemplified by acetone, dioxane or alcohol. If desired, the di-amine salt may further be decolorized or be purified by means of chromatography or recrystallization from water-alcohol, water-acetone, water-dioxane or alcohol, for instance.

EXPERIMENT 1 (TEST ON LOCAL REACTIONS)

1. Test Compounds
   A. α-sulfobenzylpenicillin disodium salt
   B. A mixture of α-sulfobenzylpenicillin disodium salt and 1-methyl-2',6'-pipecoloxylidine (an excellent local anaesthetic), the amount of the latter relative to the whole mixture being 0.5 percent on the weight basis.
   C. α-sulfobenzylpenicillin mono-L-arginine monosodium salt.
   D. α-sulfobenzylpenicillin di-L arginine salt.
   E. α-sulfobenzylpenicillin di-L-lysine salt.
   F. α-sulfobenzylpenicillin di-N-methylglucamine salt.
   G. α-sulfobenzylpenicillin di-L-ornithine salt.
2. Test Methods
   I. Each of the test compounds was subcutaneously injected to five rabbits at the concentration of 30 mg. (in terms of weight of free α-sulfobenzylpenicillin)/0.1m / rabbit and behavioral reactions of the rabbits were observed to evaluate the pain of the injection. The intensities of aching are expressed in the scoring scheme of − through +++.
   II. To evaluate other local reactions (i.e. reddening, induration and swelling), each of the test compounds was injected into the vastus lateralis muscles of five rabbits at the concentration of 300 mg. (in terms of weight of free α-sulfobenzylpenicillin)/1m /rabbit, three times at intervals of 24 hours, and a local autopsy was performed after 96 hours from the first injection to evaluate the local reactions.
3. Results Table 1

| Test Compound | Pain Reaction | Other Local Reactions |
|---|---|---|
| (A) | +++ | Positive |
| (B) | + | Positive |
| (C) | +++ | Positive |
| (D) | − | Negative |
| (E) | − | Negative |
| (F) | − | Negative |
| (G) | ± | Slightly Positive |
| Physiological saline | − | Negative |

Table 1-continued

| Test Compound | Pain Reaction | Other Local Reactions |
|---|---|---|
| Distilled water | +++ | Negative |

Remarks:
− : Painless
+ : Very weak pain
+++ : Severe pain
± : Doubtful pain
++ : Evident pain

EXPERIMENT 2 (TEST ON LOCAL REACTIONS)

1 g. (in terms of weight of free α-sulfobenzylpenicillin) of the test compound was dissolved in 3 ml of distilled water and the aqueous solution was injected to the deltoid muscles of human subjects and the local reactions were examined.

Table 2

| Test Compound | Evaluation | Number of cases |
|---|---|---|
| (A) | A violent pain was felt at the time of injection. | 2 |
| (B) | A pain was felt at the time of injection and remained for about 10 hours following the injection. A spontaneous pain lingered for an additional 4–5 hours, while a press-pain kept being felt for about 12 hours. | 5 |
| (D) | Substantially no pain was felt immediately following the injection. Almost no lasting pain was felt, either. | 5 |
| (E) | Substantially no pain was felt immediately following the injection. Almost no lasting pain was felt, either. | 5 |
| (F) | Substantially no pain was felt immediately following the injection. Almost no lasting pain was felt, either. | 5 |

The following examples are illustrative of this invention.

EXAMPLE 1

α-Sulfobenzylpenicillin di-sodium salt (45.8 g.) was dissolved in water and converted to the free acid by means of a strongly acid ion exchange resin (Amberlite IR-120 distributed by Rohm and Haas Co., U.S.) at 0°–3°C. In the meantime, 42.1 g. of L-arginine hydrochloride was dissolved in water and converted to the free base by means of a basic ion exchange resin (Amberlite IRA-411 distributed by Rohm and Haas Co., U.S.).

The resultant aqueous solution of L-arginine was promptly added to the above aqueous solution of α-sulfobenzylpenicillin. The reaction mixture was lyophilized and dried to obtain powder of α-sulfobenzylpenicillin di-L-arginine salt. The yield of the powder in terms of potency was 91 percent. Decomp. point 229°C.

Elementary analysis (for $C_{28}H_{46}N_{10}O_{11}S_2$)

| | C(%) | H(%) | N(%) |
|---|---|---|---|
| Calcd. | 44.08 | 6.08 | 18.36 |
| Found | 43.94 | 6.13 | 18.76 |

IR $\nu_{max}^{KBr}$ cm$^{-1}$: 3350(—OH,—NH), 3150 to 2300(NH$_3^+$,

⌬—CH— ), 1770(β—lactam —C=O), 1660 to 1580

(—CONH—, —NH$_3^+$, —COO$^-$), 1500, 1390, 1320, 1200, 1050(—SO$_3^-$), 700

EXAMPLE 2

α-Sulfobenzylpenicillin di-sodium salt (4.58 g.) was dissolved in water and converted to the free acid by the procedure described in Example 1.

To this solution was added a solution of 2.92 g. L-lysine in 10 ml water. The reaction mixture was concentrated under reduced pressure to a volume of about 10 ml and the concentrate was gradually added dropwise to 500 ml of acetone under stirring, whereupon α-sulfobenzylpenicillin di-L-lysine salt separated as crystalline powders. The crystals were harvested by filtration, washed with acetone and dried. The yield was 78 percent in terms of potency. Decomp. point 227°C.

Elementary analysis (for $C_{28}H_{46}N_6O_{11}S_2$)

|  | C(%) | H(%) | N(%) |
|---|---|---|---|
| Calcd. | 47.58 | 6.56 | 11.89 |
| Found | 47.46 | 6.63 | 11.97 |

IR $\nu_{max}^{KBr}$ cm$^{-1}$: 3400(—OH, —NH), 3000 to 2300(  —CH, —NH$_3^+$), 2050, 1760 (β—lactam —C=O), 1660 to 1570(—CONH—, —NH$_3^+$, —COO$^-$), 1500, 1400, 1320, 1200, 1040(—SO$_3^-$), 700

EXAMPLE 3

α-Sulfobenzylpenicillin di-sodium salt (4.58 g.) was converted to the free acid by a procedure similar to that described in Example 1.

To this solution was added an aqueous solution of 3.90 g. N-methylglucamine and the reaction product was lyophilized. The yield was 93 percent in terms of potency. Decomp. point 202°C.

Elementary analysis (for $C_{30}H_{53}N_4O_{17}S_2$)

|  | C(%) | H(%) | N(%) |
|---|---|---|---|
| Calcd. | 44.77 | 6.51 | 6.96 |
| Found | 44.73 | 6.65 | 6.91 |

IR $\nu_{max}^{KBr}$ cm$^{-1}$: 3370(—OH,—NH), 3000 to 2300(  —CH, —NH$_3^+$), 2050, 1760(β—lactam, —C=O), 1660(—CONH—), 1600(—COO$^-$), 1520, 1460, 1395, 1320, 1200, 1080 (alcohol —C—O—), 1040(—SO$_3^-$), 700

EXAMPLE 4

An aqueous solution of L-arginine hydrochloride was passed over a strongly acid ion exchange resin (Amberlite IR-120 distributed by Rohm and Haas Co., U.S.) to react the L-arginine base sufficiently with the resin. Then, at 0°–3°C, the free α-sulfobenzylpenicillin obtained by the procedure of Example 1 was passed over the resin. The fractions corresponding to pH readings of 6 to 6.5 were pooled and lyophilized to obtain α-sulfobenzylpenicillin di-L-arginine salt.

The infrared absorption spectrum of this product is in agreement with the spectrum of the product according to Example 1.

What is claimed is:

1. α-Sulfobenzylpenicillin di-amine salt in which the amine is arginine, lysine or N-methylglucamine.
2. α-Sulfobenzylpenicillin di-amine salt as claimed in claim 1, wherein the amine is L-arginine.
3. α-Sulfobenzylpenicillin di-amine salt as claimed in claim 1, wherein the amine is L-lysine.
4. α-Sulfobenzylpenicillin di-amine salt as claimed in claim 1, wherein the amine is N-methylglucamine.

* * * * *